(12) United States Patent
Ghalambor Dezfuli et al.

(10) Patent No.: US 10,952,559 B2
(45) Date of Patent: Mar. 23, 2021

(54) ELECTRIC KETTLE SYSTEM

(71) Applicant: Safran Cabin Sterling, Inc., Sterling, VA (US)

(72) Inventors: Mohammad Ghalambor Dezfuli, Sterling, VA (US); Ali Yaghoobi, Sterling, VA (US)

(73) Assignee: Safran Cabin Sterling, Inc., Sterling, VA (US)

( * ) Notice: Subject to any disclaimer, the term of this patent is extended or adjusted under 35 U.S.C. 154(b) by 114 days.

(21) Appl. No.: 16/155,409

(22) Filed: Oct. 9, 2018

(65) Prior Publication Data

US 2019/0104880 A1 Apr. 11, 2019

Related U.S. Application Data

(60) Provisional application No. 62/569,823, filed on Oct. 9, 2017.

(51) Int. Cl.
*A47J 27/21* (2006.01)
*A47J 31/00* (2006.01)

(52) U.S. Cl.
CPC ..... *A47J 27/21041* (2013.01); *A47J 27/2105* (2013.01); *A47J 27/21166* (2013.01); *A47J 31/005* (2013.01)

(58) Field of Classification Search
CPC ............ A47J 27/21041; A47J 27/21166; A47J 27/2105; A47J 31/005
See application file for complete search history.

(56) References Cited

U.S. PATENT DOCUMENTS

| | | |
|---|---|---|
| D362,582 S | 9/1995 | Wilson |
| D413,223 S | 8/1999 | Choi |
| 5,971,810 A * | 10/1999 | Taylor ................. A47J 27/2105 439/675 |
| D611,288 S | 3/2010 | Bodum |
| D627,587 S | 11/2010 | Dahlstrom |
| D628,426 S | 12/2010 | Hoare et al. |
| 8,536,490 B2 | 9/2013 | Zhang et al. |
| D731,226 S | 6/2015 | Sun |
| D738,669 S | 9/2015 | Brook |
| D747,130 S | 1/2016 | Kunz |
| D748,427 S | 2/2016 | Roux et al. |
| D757,485 S | 5/2016 | Benoit et al. |
| D760,022 S | 6/2016 | Garvey |
| D796,896 S | 9/2017 | Blaise |
| D824,723 S | 8/2018 | Averty |
| D848,488 S | 5/2019 | Cmich |
| 2014/0151359 A1 | 6/2014 | Slot et al. |
| 2015/0245723 A1 * | 9/2015 | Alexander ............. F25B 21/04 99/483 |

* cited by examiner

*Primary Examiner* — Shawntina T Fuqua
(74) *Attorney, Agent, or Firm* — Kilpatrick Townsend & Stockton LLP

(57) ABSTRACT

An electric kettle system designed for particular use onboard passenger transportation vehicles. In many instances, hot beverages are brewed using a separate beverage maker system, but it may be desirable to maintain the warmth/heat of a kettle containing the hot beverage that is separate from the beverage maker system. The electric kettle system described provides a base and a carafe with a locking connection therebetween. The system incorporates a heater plate within the carafe, and the heater plate is activated when the carafe is positioned on the base.

30 Claims, 13 Drawing Sheets

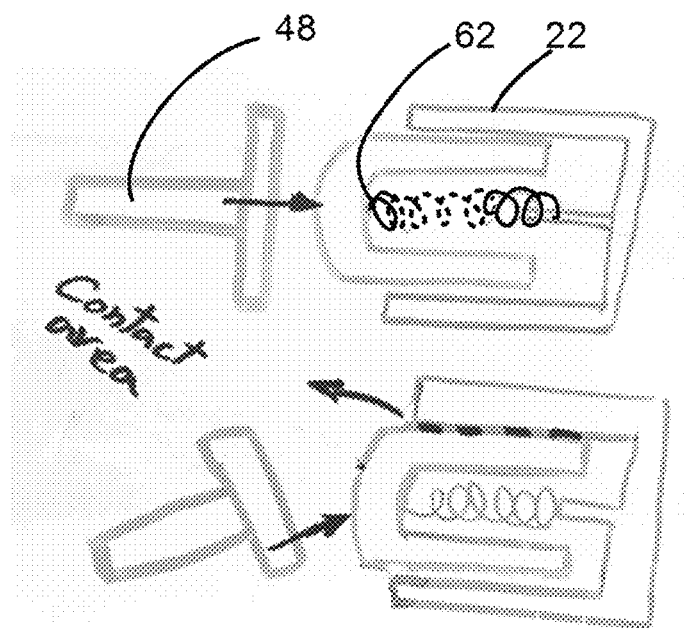
FIG. 12A
FIG. 12B
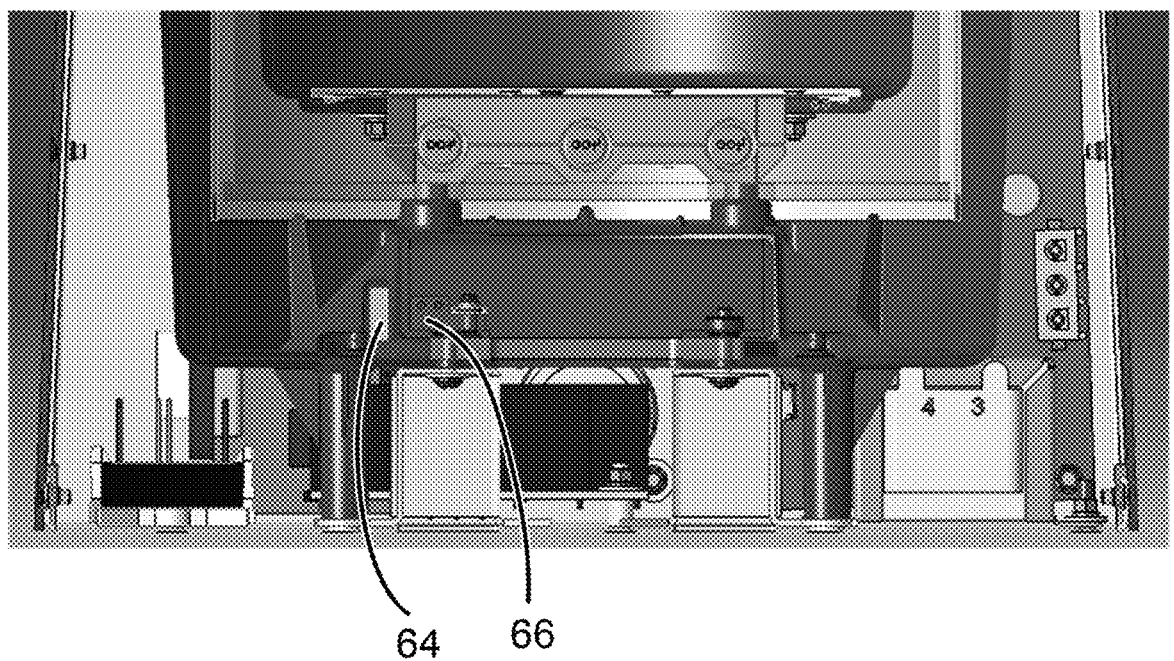
FIG 13

ELECTRIC KETTLE SYSTEM

CROSS REFERENCE TO RELATED APPLICATIONS

This application claims the benefit of U.S. Provisional Application Ser. No. 62/569,823, filed Oct. 9, 2017, titled "Electric Kettle System," the entire contents of which are hereby incorporated by reference.

FIELD OF THE DISCLOSURE

Embodiments of the present disclosure relate generally to an electric kettle system designed for particular use onboard passenger transportation vehicles. In many instances, hot beverages are brewed using a separate beverage maker system, but it may be desirable to maintain the warmth/heat of a kettle containing the hot beverage that is separate from the beverage maker system. The electric kettle system described provides a base and a carafe with a locking connection therebetween. The system incorporates a heater plate within the carafe, and the heater plate is activated when the carafe is positioned on the base.

BACKGROUND

Passenger travel has become more sophisticated in recent years. For example, airlines compete for customers, and customers have more choice when it comes to seating options, entertainment options, and beverage and meal options. Beverage and meal options in business class or first class seating can often include gourmet meals, accompanied by espresso, cappuccino, or other high-end coffee beverages. Additionally or alternatively, business aircraft also incorporate enhanced beverage and meal options. In many instances, coffee, tea, hot chocolate, and other hot beverages are desirably served at particular optimal temperatures. However, it may also be the case that the beverages are served or re-filled at locations that are distant from the aircraft galley in which the beverage is prepared. Accordingly, the present disclosure relates to an electric kettle system. The electric kettle system maintains the warmth/heat of a kettle containing a hot beverage that is separate from the beverage maker system.

BRIEF SUMMARY

Embodiments of the invention described herein thus provide an electric kettle system that provides a base and a carafe with a locking connection therebetween. The system incorporates a heater plate within the carafe, and the heater plate is activated when the carafe is positioned on the base. Specific features provide enhanced base and carafe connections, along with improved electrical connections.

In some embodiments, there is provided an electric kettle system, comprising a base and a carafe configured for electrical connection therebetween, the base comprising a carafe cooperation feature that has a carafe-interfacing electrical connection; the carafe comprising an opening cavity configured to cooperate with the carafe cooperation feature and comprising a corresponding electrical connection; and at least one locking feature configured to secure the base and carafe until released.

The carafe-interfacing electrical connection may be a series of pin receivers and the corresponding electrical connection may be a series of electrical pins, and wherein, when the carafe is positioned on the base, the pins are received by the pin receivers. The electrical pins may be angled pins. The pin receivers may be angled pin receivers.

The carafe may have slide retention plates and the-carafe cooperation feature may have plate receivers, and when the carafe is positioned on the base, the plate receivers receive slide retention plates.

The locking feature may be at least one locking pin on a carafe-facing surface of the base and a release feature with a thumb lock component on the carafe, and when the carafe is positioned on the base, the at least one locking pin secures the release feature in a locked position. In a specific example, the locking pin may be dual locking pins or multiple locking pins. The locking pin may be a plunger pin. In one example, the carafe has one or more sloped surfaces, and movement of the one or more sloped surfaces with respect to the locking pins depresses the locking pins with respect to the base.

There may be provided a magnetic system for detecting the correct positioning between the carafe and the base. There may be provided a magnetic lid system. In one example, the magnetic lid system may at least one magnet (or magnetically responsive surface) on the lid block and at least a second magnet (or magnetically responsive surface) on the lid latch, wherein cooperation between at least one magnet and at least one magnetically responsive surface (or corresponding magnet) secures the lid in a raised position.

The carafe may have a heating system. In one example, the heating system may be a heater plate, studs extending therefrom, and heater block parts configured to receive heaters therebetween.

BRIEF DESCRIPTION OF THE DRAWINGS

FIG. 12A shows a side cross-sectional view of non-angled connection and how the spring may be caused to burn by electrical contact. FIG. 12B shows a side cross-sectional view of an angled connection, illustrating improved contact features.

FIG. 13 shows a front cross-sectional view of a magnetic connection system that may be used in connection with the electric kettle system described herein.

DETAILED DESCRIPTION

Figure 1:
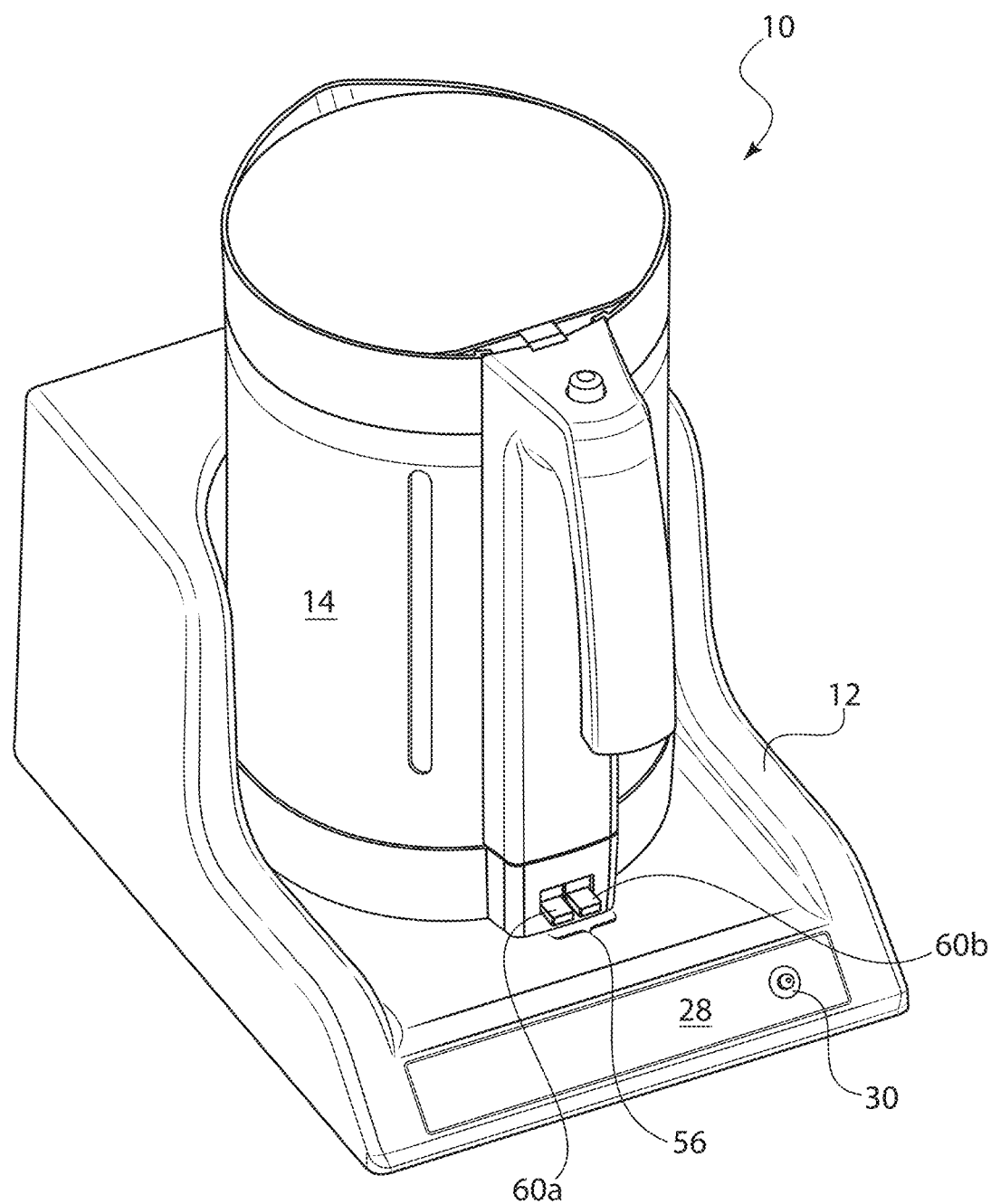
FIG. 1 shows a front perspective view of an electric kettle system described herein.
Figure 2:
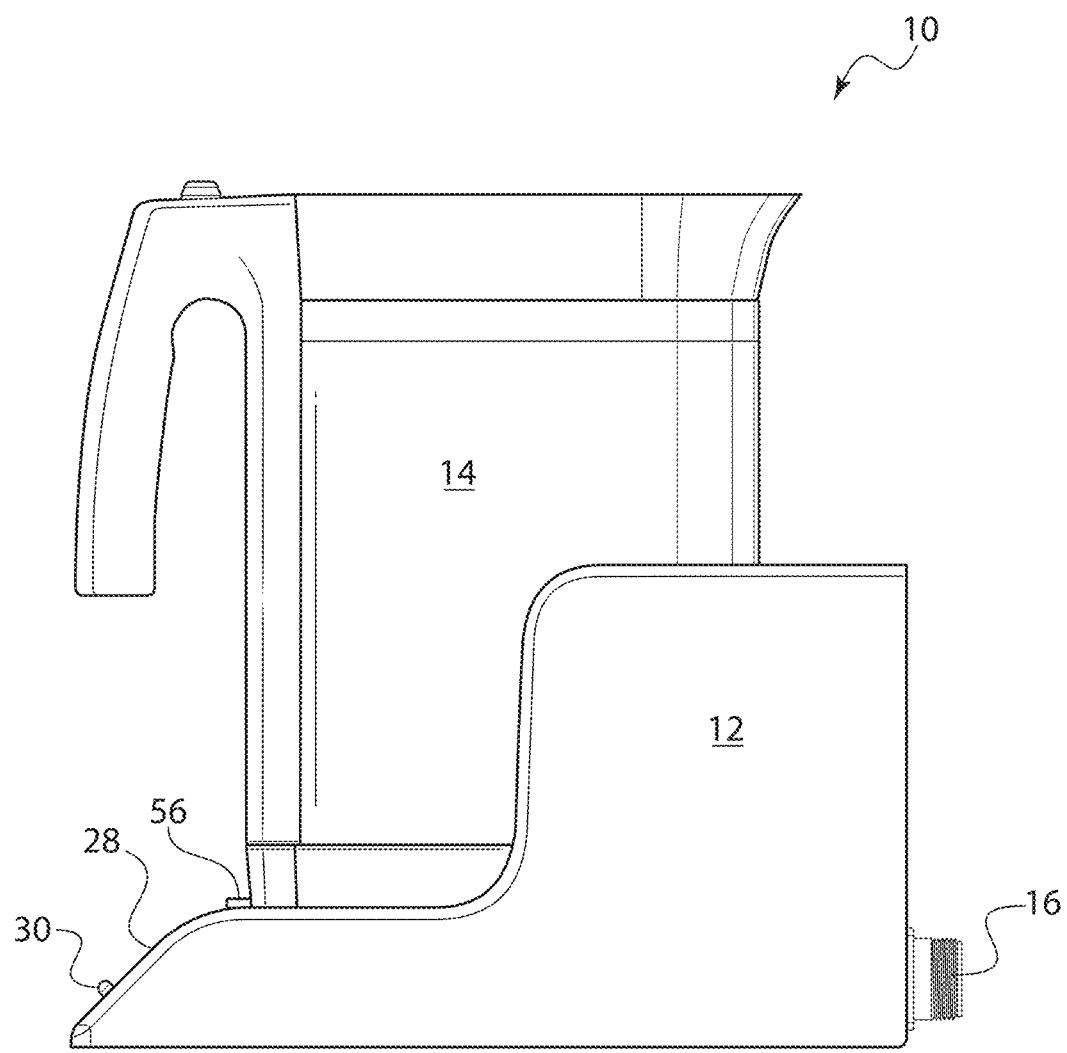
FIG. 2 shows a side plan view of the electric kettle system of FIG. 1.

Embodiments of the present invention provide an electric kettle system 10. Primary components of the system are a base 12 and a carafe 14, as illustrated by FIGS. 1 and 2. The base 12 is configured to be positioned on a countertop or other surface and to slidingly receive the carafe 14. The base has a rear connection 16 that cooperates with aircraft or other vehicle power. The rear connection 16 is illustrated as a traditional aircraft connector, but it should be understood that other connection systems may be used and are considered within the scope of this disclosure.

Figure 3:
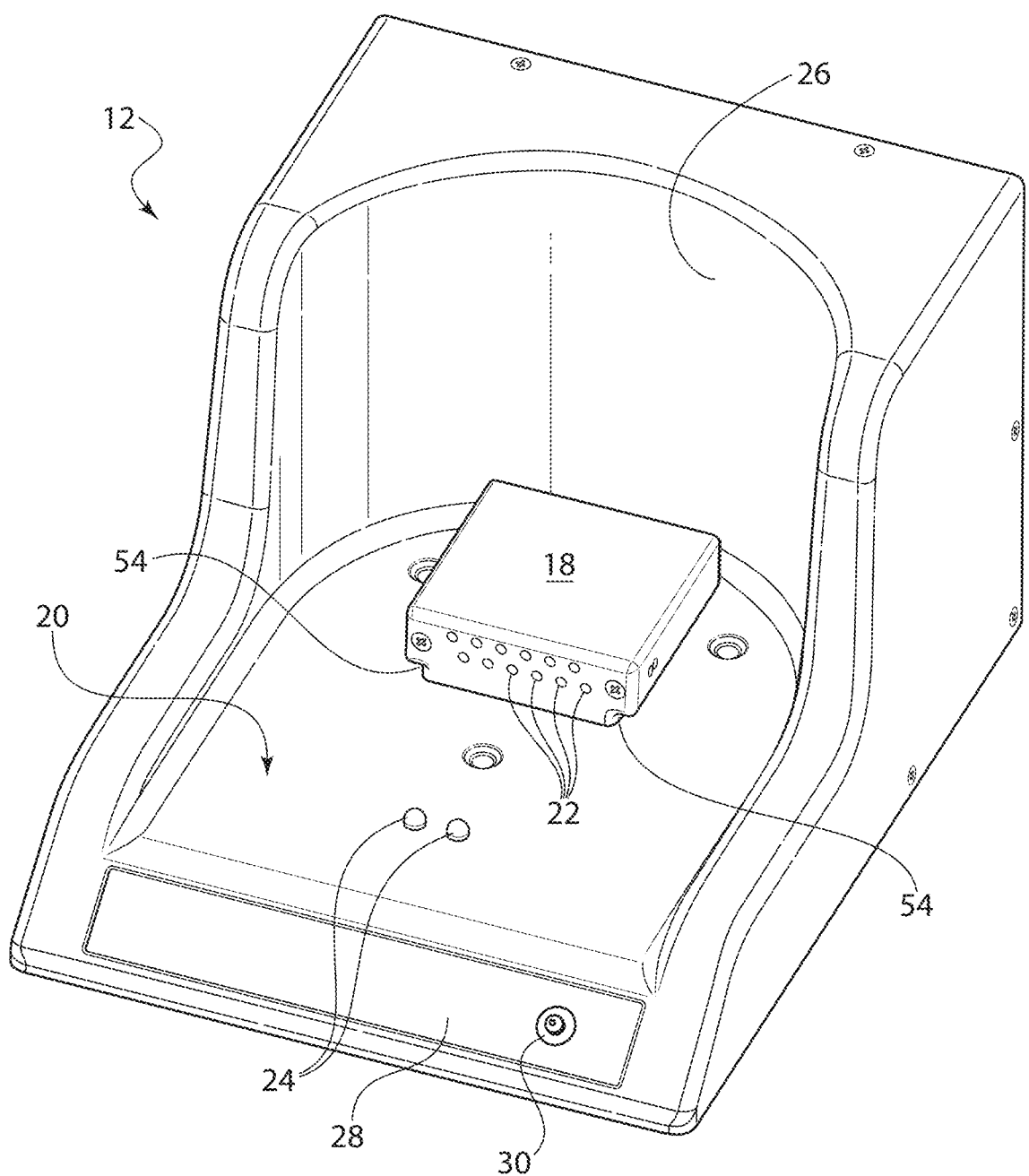
FIG. 3 shows a side perspective view of one embodiment of a base for use with the electric kettle system described herein.

FIG. 3 illustrates the base 12 without a carafe positioned with respect thereto. As shown, the base 12 has a carafe cooperation feature 18 on its carafe-facing surface 20. This carafe cooperation feature 18 may be a rectangular or box shaped structure having a plurality of pin receivers 22, which will be described in more detail below. The carafe-facing surface 20 is also provided with one or more carafe locking pins 24. In a specific embodiment, the locking pins 24 are depressible into the base 12, which will be described in more detail below. The base 12 is shown with a curved carafe-facing wall 26 which is configured to receive and support the carafe 14, as illustrated by FIGS. 1 and 2. Additionally, the base 12 has a front face 28 which may support an on-off button 30.

Although the base is described as having pin receivers 22 and locking pins 24 (with corresponding pins and release feature positioned on the carafe), it should be understood that pin receivers and locking pins may be positioned on the carafe, with the corresponding pins and release features described below positioned on the base if desired. Alternate positions are considered within the scope of this disclosure.

Figure 4:
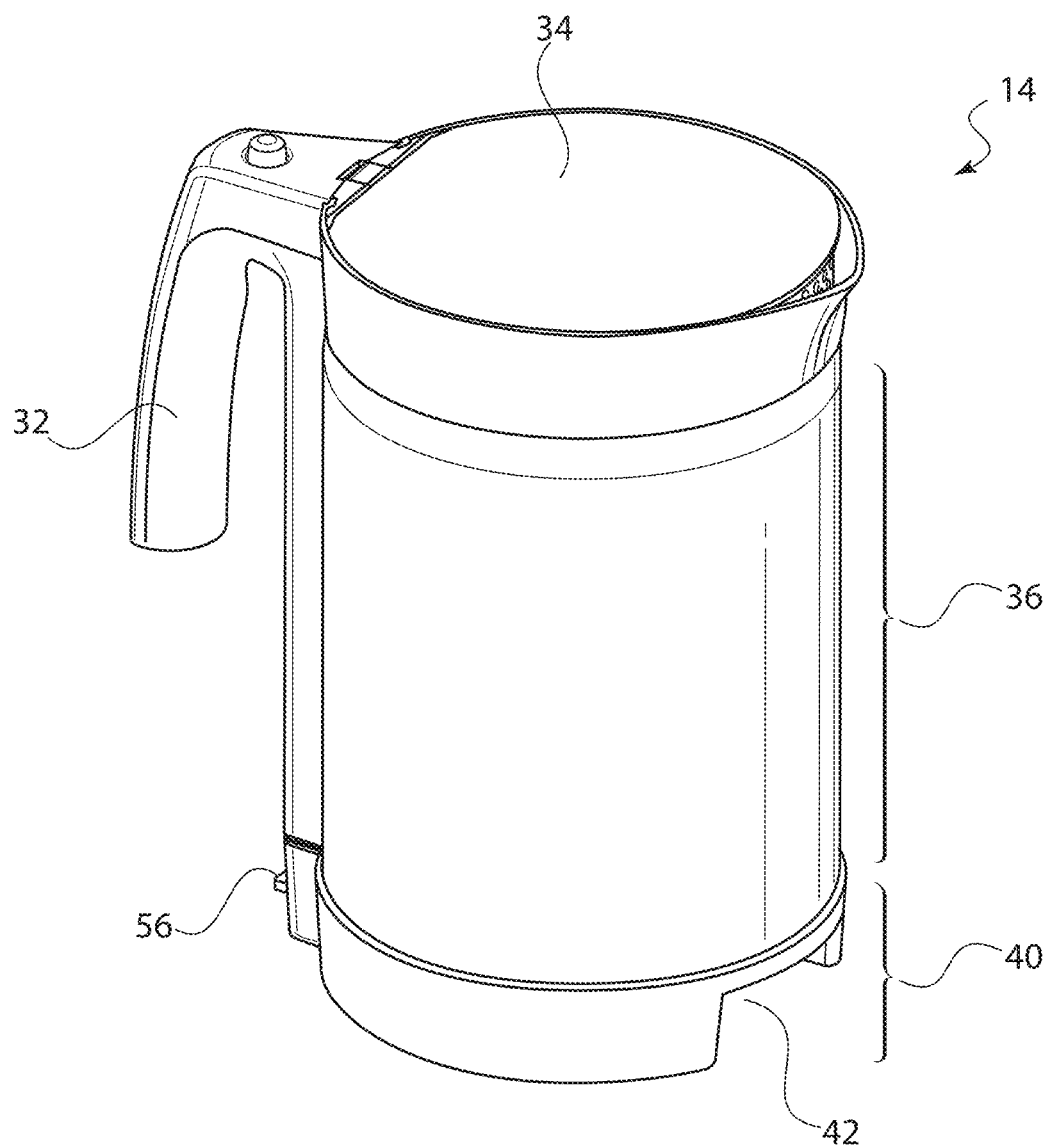
FIG. 4 shows a side perspective view of one embodiment of a carafe for use with the electric kettle system described herein.
Figure 5:
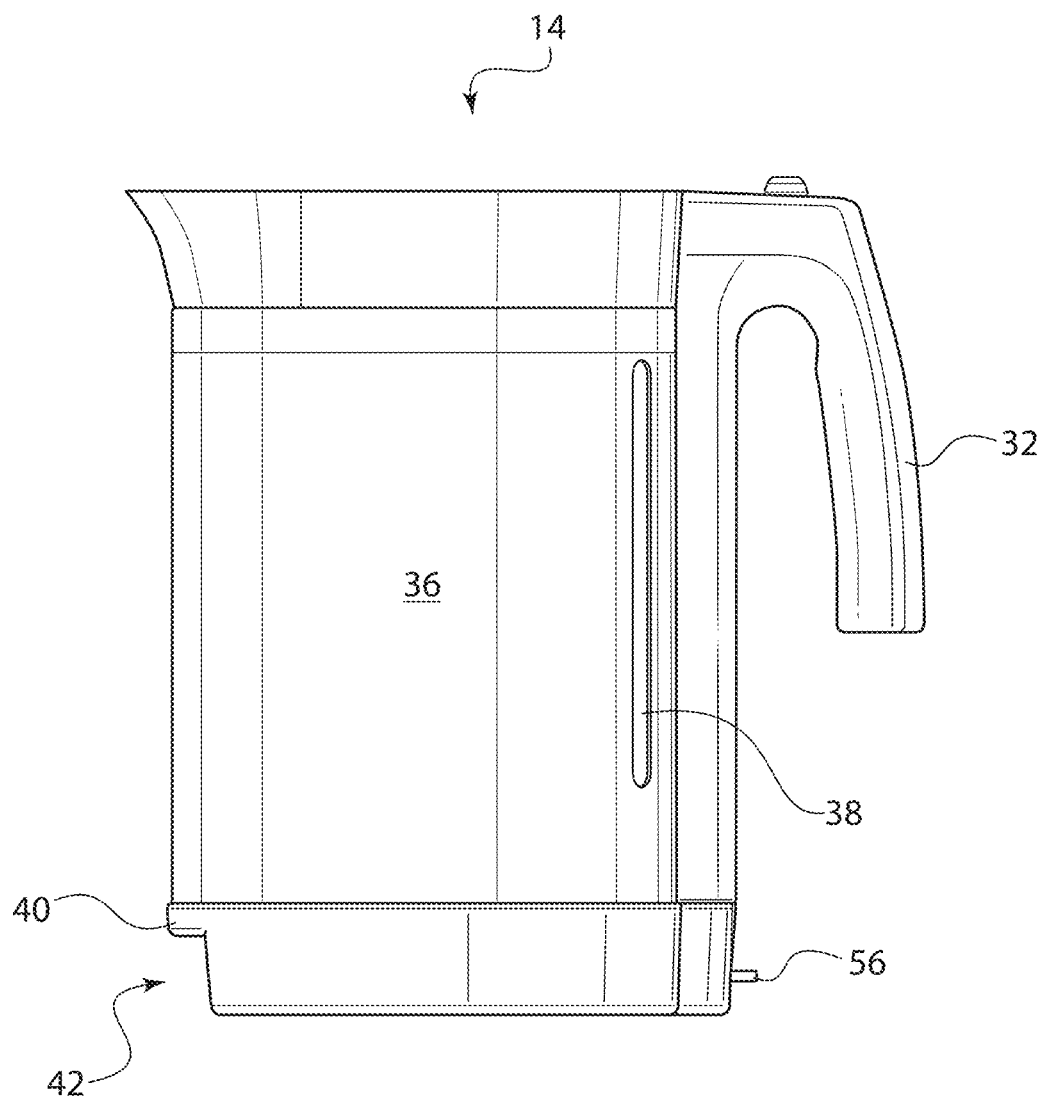
FIG. 5 shows a side plan view of the carafe of FIG. 4.
Figure 6:
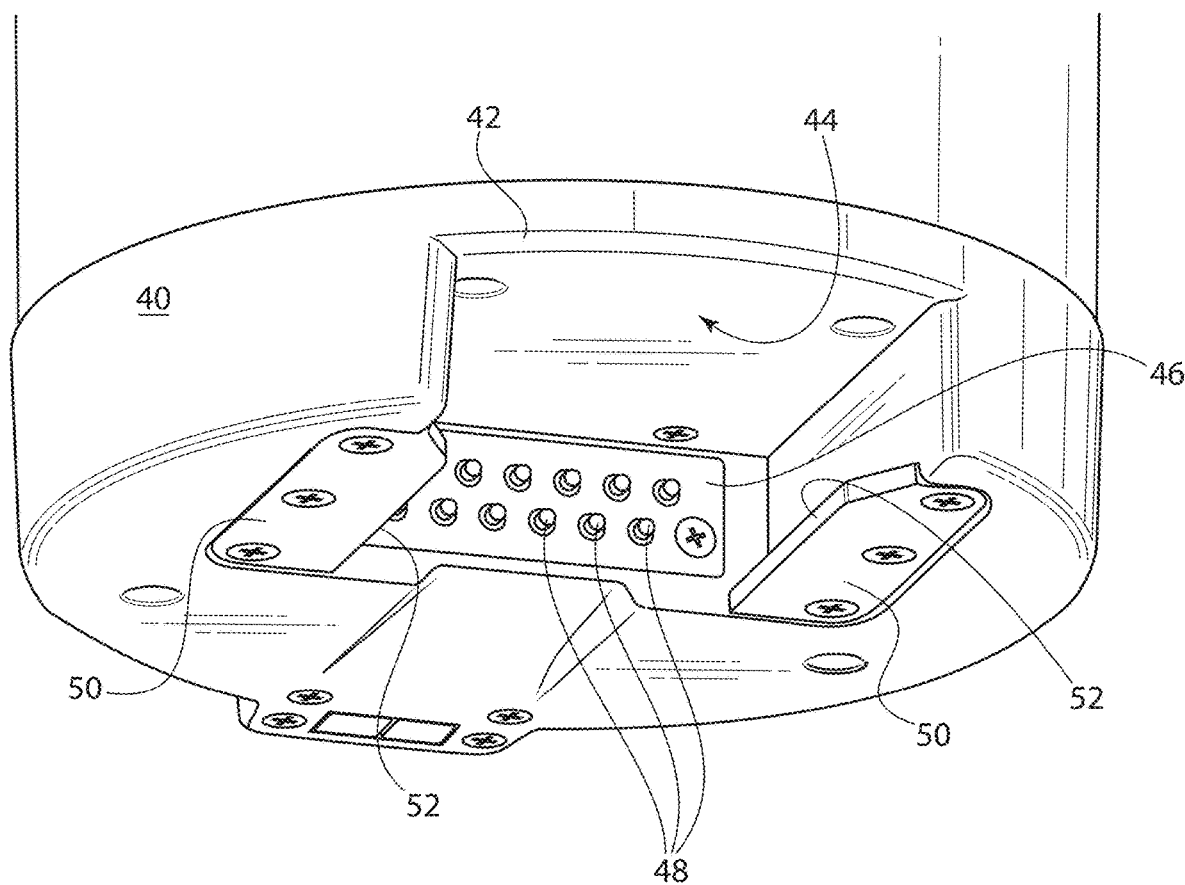
FIG. 6 shows a perspective partial view of the base portion of a carafe.

FIGS. 4 and 5 illustrate the carafe 14 without being positioned on a base. As shown, the carafe has a handle 32, lid 34, body 36, sight gauge 38, and foundation portion 40. The foundation portion 40 has a front opening 42, which leads to an internal cavity 44 of the foundation portion 40, as shown by FIG. 6. In use, the internal cavity 44 cooperates with the carafe-cooperation feature 18 of the base 12. The carafe cooperation feature 18 is sized similarly to the internal cavity 44, such that it functions as a slide guide to properly position the carafe 14. As shown by FIG. 6, which is a front perspective view looking into the opening 42, the internal cavity 44 is defined by a plate 46 that supports a plurality of pins 48. In use, the pins 48 cooperate with and are received by the pin receivers 22 of the carafe-cooperation feature 18 of the base 12. In a specific example, the pins 48 may be spring-loaded. In other examples, the pins 48 and/or pin receivers 22 may be angled. Cooperation between the pins and pin receivers provides an electrical connection between the base 12 and the carafe 14, which will be described further below.

Figure 7:
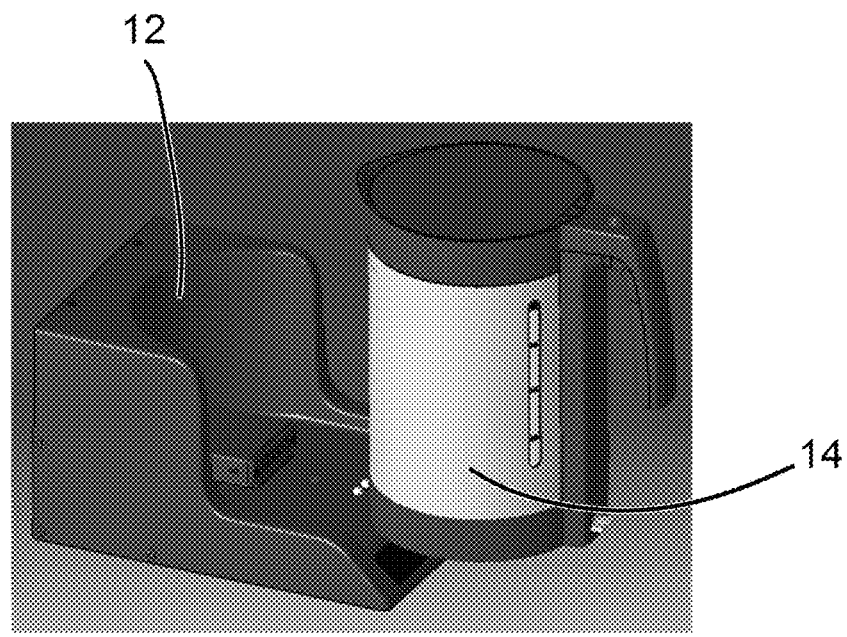
FIG. 7 shows a side perspective view of a carafe as it is being positioned on a base.
Figure 8:
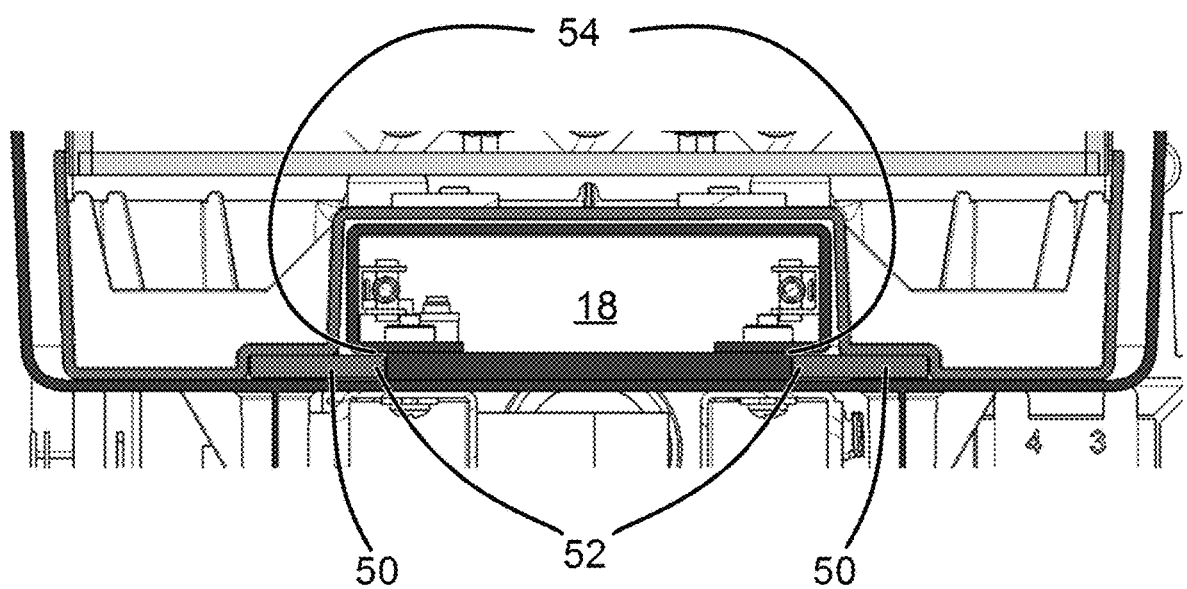
FIG. 8 shows a front cross-sectional view of the securement cooperation between a carafe and a base.

In use, the carafe 14 slides onto the base 12 in the configuration illustrated by FIG. 7. More than one securement or locking feature may be provided for securement therebetween. Referring back to FIG. 6, the internal cavity is shown having slide retention plates 50. The slide retention plates 50 are secured to a lower surface of the foundation portion 40 and have edges 52 that extended slightly into the internal cavity 44 space. In use, the edges 52 of the slide retention plates 50 are received by plate receivers 54 of the carafe-cooperation feature 18. This is illustrated by the side cross-sectional view of FIG. 8. In one example, the plate receivers 54 are lower grooves configured to receive side edges 52 of the slide retention plates 50. This provides a primary securement for securing the base 12 and carafe 14 to one another. A locking feature may additionally be provided with this securement feature. Many aircraft regulations require dual locking for items that could become a projectile in air turbulence. Accordingly, this may provide a first locking system (which may be used in conjunction with a separate second locking system). Additionally or alternatively, a separate dual locking feature may be provided.

In one example, the dual locking feature may be provided as a cooperation between locking pins 24 of the base 12 and a release feature 56 of the carafe 14. Although two locking pins 24 are shown in the figures, it should be understood that if dual locking is not required, only a single locking pin they be provided. Additionally, it is also possible to provide more than two locking pins 24 or any number of locking pins, if desired.

Figure 9A:
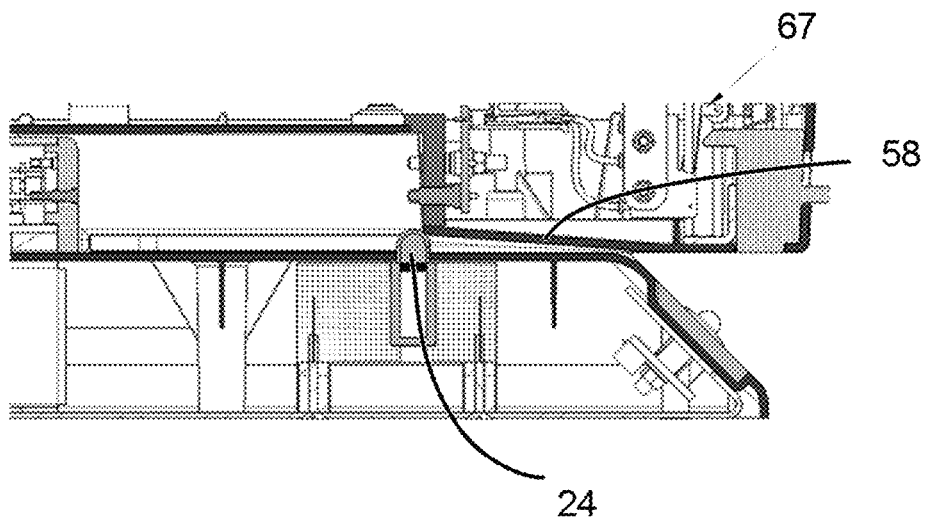
FIG. 9A shows a side cross-sectional view of a carafe as it is being positioned on a base, with locking pin(s) raised.
Figure 9B:
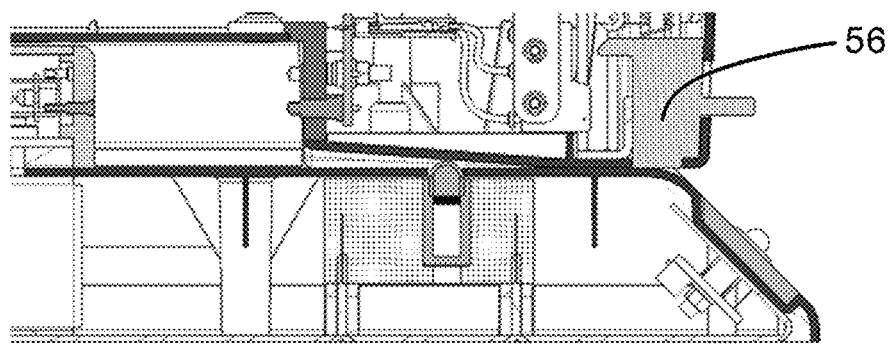
FIG. 9B shows a side cross-sectional view of a carafe as it is being positioned on a base, with locking pin(s) being depressed by a sloped base of the carafe.
Figure 9C:
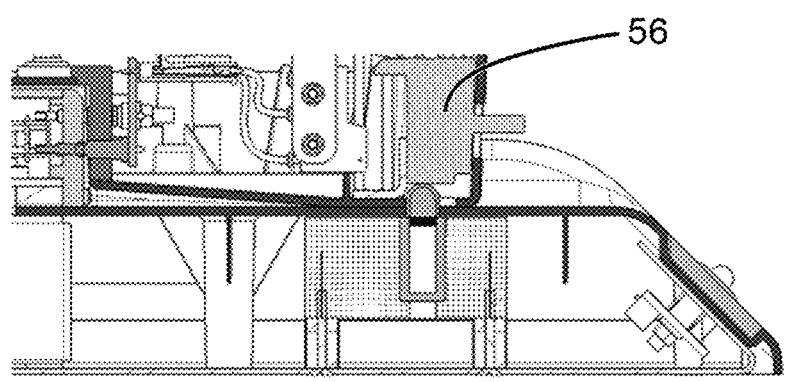
FIG. 9C shows a side cross-sectional view of a carafe as it is being positioned on a base, with locking pin(s) raised and securing a release mechanism of the carafe. This figure also shows electrical pins of the carafe secured to pin receivers of the base.

Referring now to FIGS. 9A-9C, the lower surface of carafe 14 may be provided with a sloped surface 58. Sloped surface 58 may define a constant slope or it may define one or more sloped surfaces. In a specific example, sloped surface 58 slopes rearwardly, from front to back as shown by FIG. 9A. As the carafe 14 is moved forward with respect to the base 12, the downward slope of sloped surface 58 pushes down on the locking pins 24, which function much like plungers or ball and detent mechanisms. This is illustrated by FIGS. 9B and 9C. As the carafe 14 is moved so that the locking pins 24 are toward the rear of the carafe 14, the locking pins 24 apply upward pressure on a release feature 56, positioned at the rear of the carafe 14. This is illustrated by the locked position of FIG. 9C. This moves the release feature 56 to a locked position. The release feature 56 may be moved via a thumb lock component. In one example, the number of thumb lock components may correspond to the number of locking pins, and any number of components and pins may be provided. Referring back to FIG. 1, the release feature 56 is shown with dual thumb lock components 60a and 60b that are designed to be activated by a single thumb press, but that provide dual locking features with respect to the dual locking pins 24. If one of the locking pins 24 and thumb lock components (60a or 60b or any others that may be provided) were to fail, another set is intended to still provide the necessary locking function. When a user wishes to remove the carafe 14 from the base 12, downward pressure on the release feature 56 pushes the locking pins 24 down, releasing the carafe 14. The slide retention plates 50 fix five degrees of freedom, and the locking pins 24 fix the sixth degree of freedom.

Figure 10:
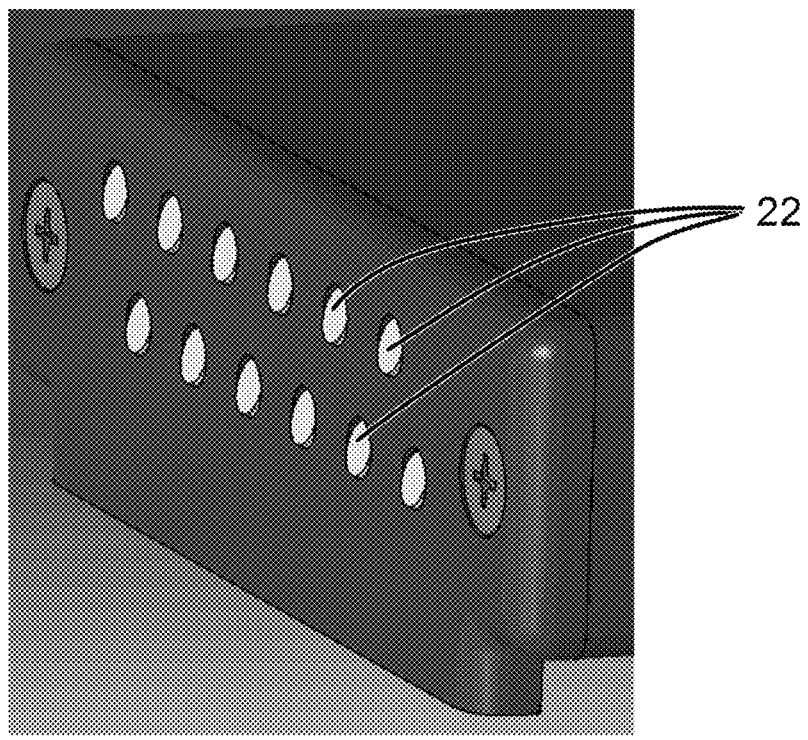
FIG. 10 shows a side perspective view of angled pin receivers of a base.
Figure 11:
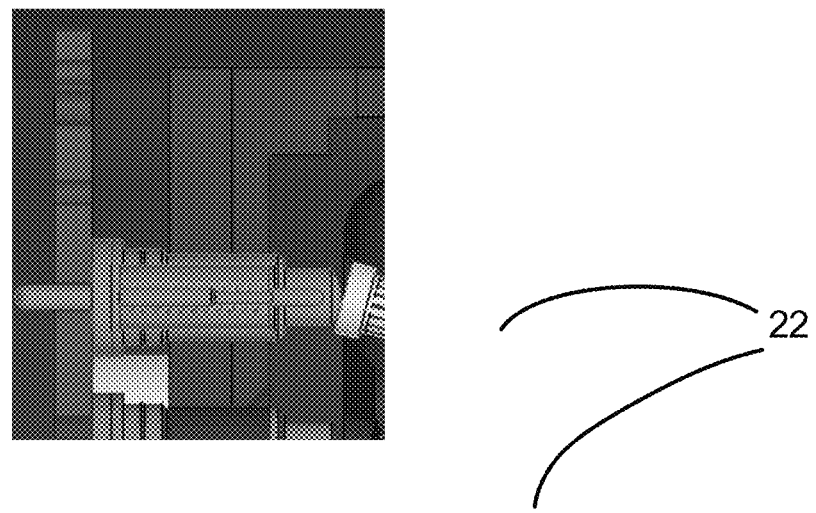
FIG. 11 shows a side cross-sectional view of angled pin receivers in contact with carafe spring-loaded pins.

In addition to providing securement and locking functions, the base 12 also functions as an electrical connection to provide electrical power to the carafe 14. The rear connection 16 cooperates with aircraft (or other vehicle) power. Electrical connection between the pin receivers 22 of the base and the pins 48 of the carafe provide electrical power to a heating system of the carafe, which heating system is described in more detail below. Referring now to the electrical connection, it has been found that use of spring-loaded pins forming the connection between the base and the carafe is one connection embodiment. In an alternate embodiment, in order to improve the reliability and to guarantee good contact between the moving part of the pin and its case, it is possible to add an angle to the mating cooperation. In one example, the pin receivers 22 are angled. This is illustrated by FIG. 10. In a specific embodiment, the angle may be about ten degrees, fifteen degrees, twenty degrees, twenty five degrees, or any other appropriate angle. In another example, the pins 48 are angled. This is illustrated by FIGS. 11-12. Providing angled cooperation system causes a portion of the force to push the moving part (in most instances, the pins 48) against the pin case. This ensures that the tiny spring 62 inside does not need to carry the whole current, preventing it from burning by electrical current during kettle operation. Enhanced contact position is illustrated by the dashed lines in FIG. 12.

As mentioned above, although the base is described as having pin receivers 22 and locking pins 24 (with corresponding pins 48 and release feature 56 positioned on the carafe 14), it should be understood that pin receivers and locking pins may be positioned on the carafe, with the corresponding pins and release features positioned on the base if desired. Alternate positions are considered within the scope of this disclosure.

FIG. 13 also illustrates a magnet sensing system. The magnet sensing system uses a magnet 64 and a magnet switch 66. In one example, the magnet 64 may be positioned on the carafe and the magnet switch 66 may be positioned on the base. It should be understood that these locations may be switched. One purpose of providing a magnet 64 and magnet switch 66 on the kettle system is to have more than one separate sensing method to detect that the carafe 14 is installed before energizing the electrical pins 48. Multiple sensing methods may work in parallel to ensure that the carafe is properly installed. For example, a first sensing may be conducted by closing the circuit between the pin receivers 22 and the pins 48. A second circuit may be closed by the magnet sensing system. As soon as the carafe 14 is installed and the locking pins 24 are pushed up and in position, they actuate a microswitch 67 (shown in FIG. 9A) which closes the loop (and the kettle controller acknowledges that the loop is closed via cooperation between pin receivers 22 and pins 48). Microswitch 67 is actuated by movement of the thumb release blocks of release feature 56 when they move up by the locking pins 24.

Properly positioning the carafe 14 on the 12 base thus closes two different circuits, ensuring that the carafe is placed properly and locked fully in its place. In the example shown, a magnet 64 is located on the carafe 14 and the magnet switch 66 is located on the base 12. It should be understood, however, that these components may have their location switched.

Figure 14:
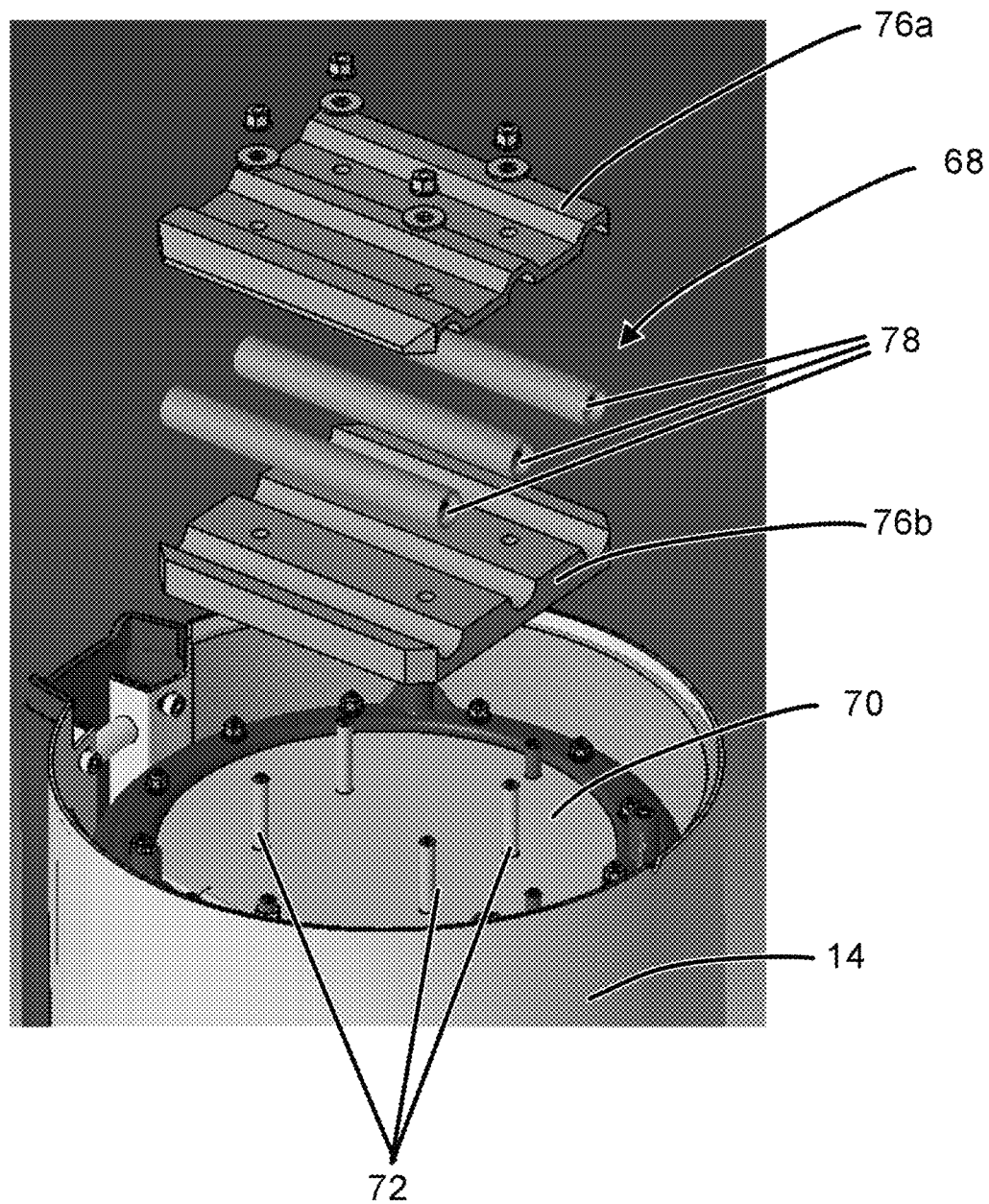
FIG. 14 shows an exploded perspective view of a lower portion of a carafe, illustrating heating system components.
Figure 15:
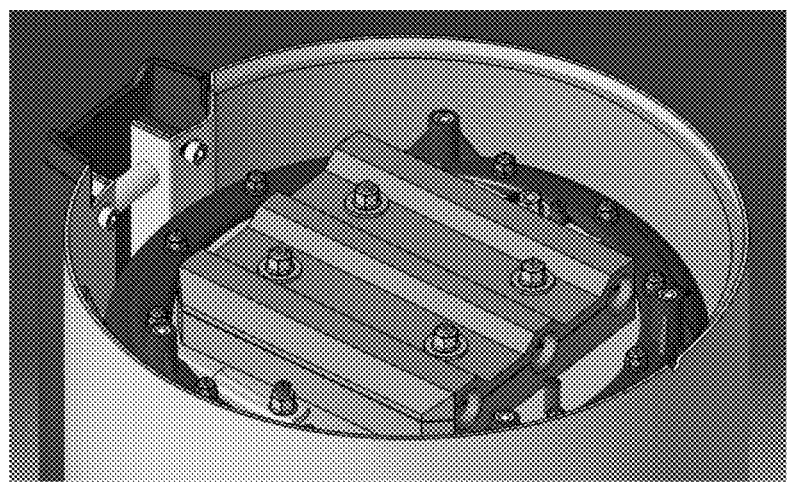
FIG. 15 shows the heating system of FIG. 14 in an assembled configuration.
Figure 16:
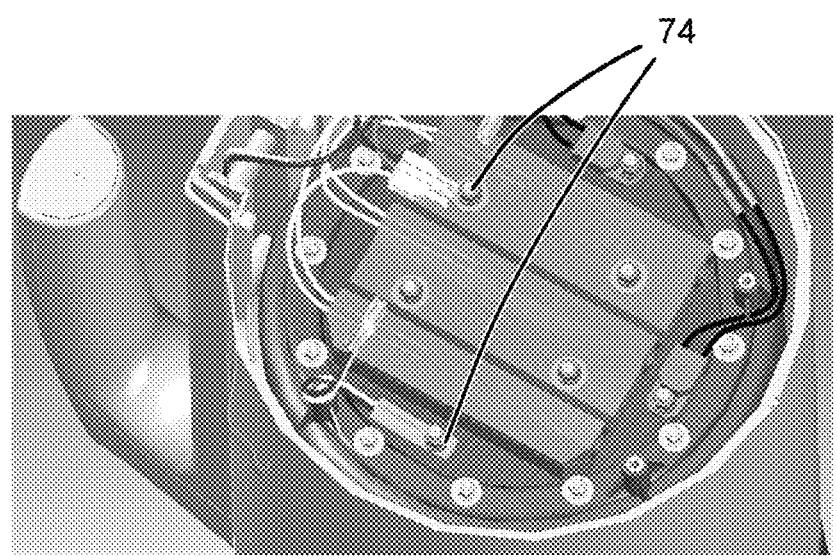
FIG. 16 shows the heating system of FIG. 15, with thermocouples positioned with respect thereto.
Figure 17:
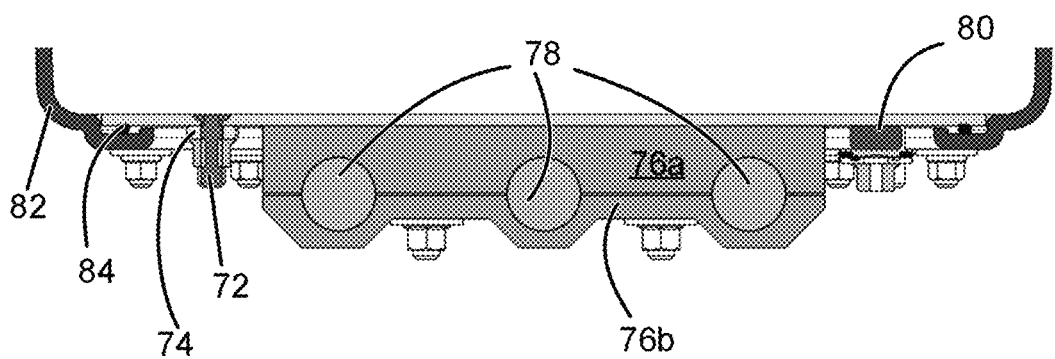
FIG. 17 shows a side cross-sectional view of one embodiment of a heating system for use with the electric kettle system described herein.

Once electrical connection has been established between the base 12 and the carafe, it provides power to the heating system 68 of the carafe 14. The heater system 68 may be any appropriate heating system. A specific example is illustrated by FIGS. 14 and 15, although this is provided for illustration purposes in this not intended to be limiting in any way. In the specific example shown, the heating system 68 is provided by a heater plate 70 which is positioned on a lower portion of the carafe 14, near the foundation portion. The heater plate 70 has a plurality of studs 72 extending therefrom. Studs 72 are configured to receive one or more thermocouple fittings 74, as shown in FIGS. 16 and 17. In a specific example, two thermocouples are used to control operation of the kettle system. One thermocouple 74 may be positioned under or above the heater plate 70. A second thermocouple may be positioned inside the carafe body in order to sense raised steam from boiling water. Both thermocouples feed the controller with real time temperature readings in order to calculate the temperature change. This is necessary in order to detect various operating conditions such as whether the carafe is empty (on a dry run) and when the water is boiling (e.g., which may occur at different temperatures at different altitudes).

Also positioned on the heater plate 70 are heater block parts 76 (e.g., 76a and 76b) which receive and support heaters 78. The heater block parts 76 may have groups configured to receive and support the heaters 78. In a specific example, heater block parts 76 are configured to sandwich heaters therebetween and are secured to one another in order to clamp heaters 78 in place. An assembled heater system 68 is illustrated by FIG. 17.

In a specific example, the heater plate 70 is aluminum sheet metal. The studs 72 may be self-clinching studs that are used to assemble and support the heater block parts 76, the heaters 78, thermocouple fittings 72, and thermostats 80. An inner liner 82 and/or an O-ring seal 84 may be used to secure the heater plate 70 in place and the carafe 14.

The electric kettle system 10 described herein operates via a button(s) 30 located on the front face 28 of the base assembly 12. Once the carafe 14 is properly positioned with respect to the base 12, the unit may be turned on for use. Various design or lighting features may be provided for aesthetic purposes. For example, a lighted opaque/colored ring around the button 30 may be provided to show the status of the system. During standby time, the light may fade. By depressing the button 30, the light becomes bright and stays bright during operation, until the kettle reaches the boiling point, at which point the colored light may begin to fade. The light may also be designed to blink quickly or a different color if the carafe has not been properly located completely on base 12, if the heater system 68 is too hot (e.g., carafe is empty), or for any other appropriate warning signal.

A water level sight gauge 38 may be useful in this instance, in order to allow the user to determine whether the kettle is full.

Figure 18:
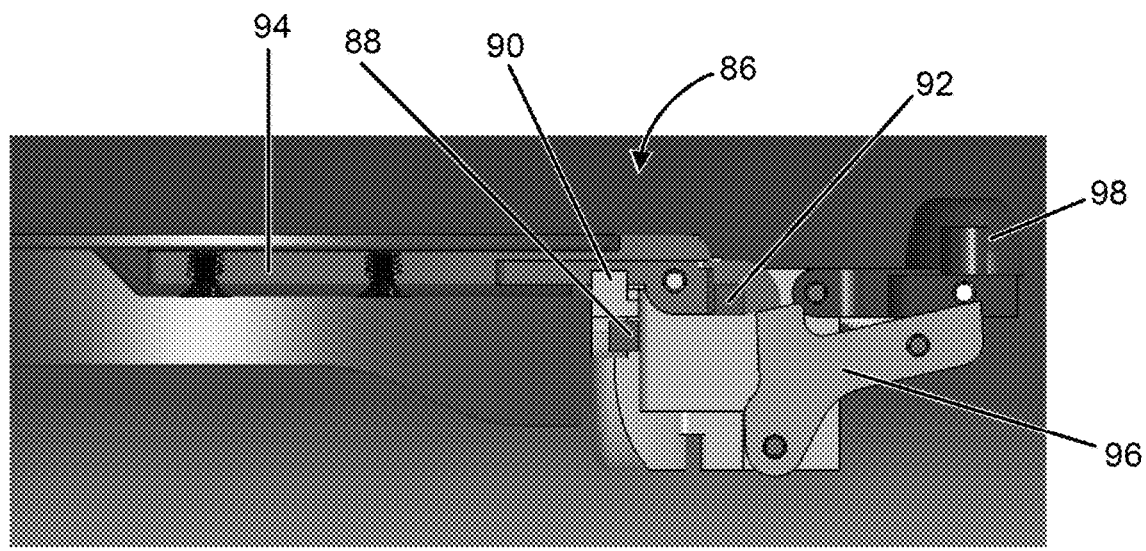
FIG. 18 shows a side cross-sectional view of a magnetic lid system.
Figure 19:
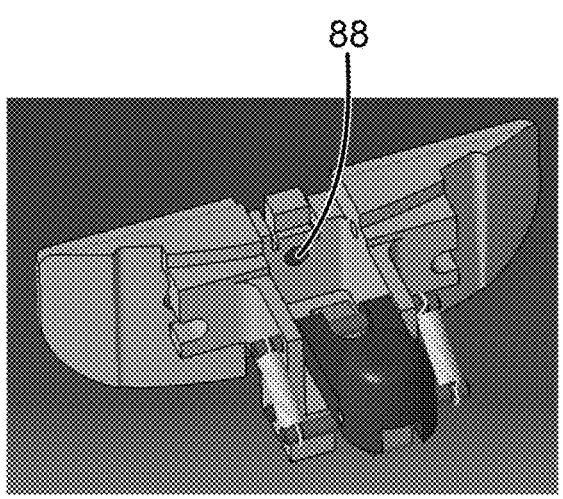
FIG. 19 shows a rear perspective view of a magnet positioned on the carafe.
Figure 20:
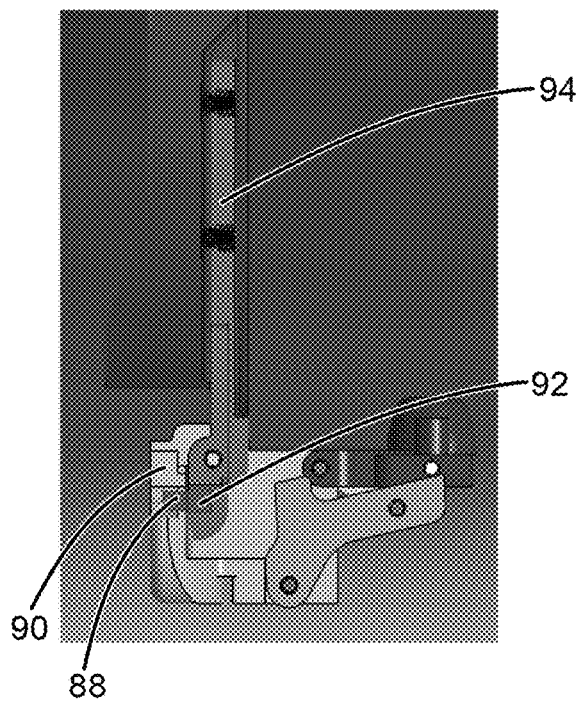
FIG. 20 shows a side cross-sectional view of lid raised and held in place via a magnetic lid system.

An additional enhancement feature of the kettle system 10 may be a magnetic lid system 86. The magnetic lid system 86 includes a first magnet 88 on the lid holder block 90 (shown by FIGS. 18 and 19) and a second magnet 92 on a lid latch 94 (shown by FIGS. 18 and 20). Instead of two magnets, it is possible to use a magnet as a first portion of the system 86 and a magnetically responsive surface as a second portion of the system. As shown by FIG. 18, a release lever 96 is held in place by a button 98. When the button 98 is depressed, the release lever releases 96 the lid latch 94. Springs release the lid, and then magnetic attraction between the first magnet 88 and the second magnet 92 (or one magnet and a magnetically responsive surface) helps hold the lid 34 and the raised vertical position illustrated by FIG. 20.

It should be understood that various different features described herein may be used interchangeably with various embodiments. For example, if one feature is described with respect to particular example, it is understood that the same feature may be used with other examples as well.

Changes and modifications, additions and deletions may be made to the structures and methods recited above and shown in the drawings without departing from the scope or spirit of the disclosure or the following claims.

What is claimed is:

1. An electric kettle system, comprising:
   a base and a carafe configured for electrical connection therebetween,
   the base comprising a carafe cooperation feature that has a carafe-interfacing electrical connection;
   the carafe comprising an opening cavity configured to cooperate with the carafe cooperation feature and comprising a corresponding electrical connection; and
   at least one locking feature configured to secure the base and carafe until released,
   wherein the at least one locking feature comprises at least one locking pin on a carafe-facing surface of the base and a release feature with a thumb lock component on the carafe, and
   wherein, when the carafe is positioned on the base, the at least one locking pin secures the release feature in a locked position.

2. The system of claim 1, wherein the carafe-interfacing electrical connection comprises a series of pin receivers and wherein the corresponding electrical connection comprises a series of electrical pins, and wherein, when the carafe is positioned on the base, the pins are received by the pin receivers.

3. The system of claim 2, wherein the electrical pins are angled pins.

4. The system of claim 2, wherein the pin receivers comprise angled pin receivers.

5. The system of claim 1, wherein the carafe comprises slide retention plates, wherein the carafe cooperation feature comprises plate receivers, and wherein, when the carafe is positioned on the base, the plate receivers receive slide retention plates.

6. The system of claim 1, wherein the at least one locking pin comprises dual locking pins or multiple locking pins.

7. The system of claim 1, wherein the at least one locking pin comprises a plunger pin.

8. The system of claim 1, wherein the carafe comprises one or more sloped surfaces, wherein movement of the one or more sloped surfaces with respect to the locking pins depresses the locking pins with respect to the base.

9. The system of claim 1, wherein the carafe further comprises a heating system.

10. The system of claim 1, further comprising a magnetic lid system.

11. The system of claim 9, wherein the heating system comprises a heater plate, studs extending therefrom, and heater block parts configured to receive heaters therebetween.

12. The system of claim 10, wherein the magnetic lid system comprises at least one magnet or magnetically responsive surface on the lid block and at least a second magnet or magnetically responsive surface on the lid latch, wherein cooperation between at least one magnet and at least one magnetically responsive surface or corresponding magnet secures the lid in a raised position.

13. An electric kettle system, comprising:
    a base and a carafe configured for electrical connection therebetween,
    the base comprising a carafe cooperation feature that has a carafe-interfacing electrical connection;
    the carafe comprising an opening cavity configured to cooperate with the carafe cooperation feature and comprising a corresponding electrical connection;
    at least one locking feature configured to secure the base and carafe until released, and a magnetic system for detecting the correct positioning between the carafe and the base.

14. The system of claim 13, wherein the carafe further comprises a heating system.

15. The system of claim 13, further comprising a magnetic lid system.

16. The system of claim 13, wherein the one or more pin receivers comprise angled pin receivers.

17. The system of claim 14, wherein the heating system comprises a heater plate, studs extending therefrom, and heater block parts configured to receive heaters therebetween.

18. The system of claim 15, wherein the magnetic lid system comprises at least one magnet or magnetically responsive surface on the lid block and at least a second magnet or magnetically responsive surface on the lid latch, wherein cooperation between at least one magnet and at least one magnetically responsive surface or corresponding magnet secures the lid in a raised position.

19. An electric kettle system, comprising:
    a base and a carafe configured for electrical connection therebetween,
    the base comprising a carafe cooperation feature that has one or more pin receivers and one or more plate receivers;
    the carafe comprising foundation portion having (a) an opening cavity configured to cooperate with the carafe cooperation feature and comprising one or more pins corresponding to the one or more pin receivers and (b) slide retention plates; and
    a locking feature configured to secure the base and carafe until released, comprising at least one locking plunger pin on a carafe facing surface of the base and a release feature with a thumb lock component on the carafe,
    wherein, when the carafe is positioned on the base,
    the one or more plate receivers receive the slide retention plates,
    the one or more pin receivers receive the one or more pins,
    the at least one locking plunger pin secure the release feature in a locked position,
    wherein the carafe comprises one or more sloped surfaces, wherein movement of the one or more sloped surfaces with respect to the dual locking plunger pins depresses the at least one locking plunger pin with respect to the base.

20. The system of claim 19, wherein the carafe further comprises a heating system.

21. The system of claim 19, further comprising a magnetic lid system.

22. The system of claim 19, wherein the one or more pin receivers comprise angled pin receivers.

23. The system of claim 20, wherein the heating system comprises a heater plate, studs extending therefrom, and heater block parts configured to receive heaters therebetween.

24. The system of claim 21, wherein the magnetic lid system comprises at least one magnet or magnetically responsive surface on the lid block and at least a second magnet or magnetically responsive surface on the lid latch, wherein cooperation between at least one magnet and at least one magnetically responsive surface or corresponding magnet secures the lid in a raised position.

25. An electric kettle system, comprising:
  a base and a carafe configured for electrical connection therebetween,
  the base comprising a carafe cooperation feature that has one or more pin receivers and one or more plate receivers;
  the carafe comprising foundation portion having (a) an opening cavity configured to cooperate with the carafe cooperation feature and comprising one or more pins corresponding to the one or more pin receivers and (b) slide retention plates; and
  a locking feature configured to secure the base and carafe until released, comprising at least one locking plunger pin on a carafe facing surface of the base and a release feature with a thumb lock component on the carafe,
  wherein, when the carafe is positioned on the base,
  the one or more plate receivers receive the slide retention plates,
  the one or more pin receivers receive the one or more pins, the at least one locking plunger pin secure the release feature in a locked position, and a magnetic system for detecting the correct positioning between the carafe and the base.

26. The system of claim 25, wherein the carafe further comprises a heating system.

27. The system of claim 25, further comprising a magnetic lid system.

28. The system of claim 25, wherein the one or more pin receivers comprise angled pin receivers.

29. The system of claim 26, wherein the heating system comprises a heater plate, studs extending therefrom, and heater block parts configured to receive heaters therebetween.

30. The system of claim 27, wherein the magnetic lid system comprises at least one magnet or magnetically responsive surface on the lid block and at least a second magnet or magnetically responsive surface on the lid latch, wherein cooperation between at least one magnet and at least one magnetically responsive surface or corresponding magnet secures the lid in a raised position.

* * * * *